US00RE44671E

(19) United States
(12) Reissued Patent
Smithies et al.

(10) Patent Number: US RE44,671 E
(45) Date of Reissued Patent: Dec. 24, 2013

(54) SYSTEM AND METHOD FOR VERIFICATION OF PERSONAL IDENTITY

(71) Applicant: New Model Identity Limited, Bath (GB)

(72) Inventors: Christopher P. K. Smithies, Corfe Mullen (GB); Jeremy M. Newman, Frome (GB)

(73) Assignee: New Model Identity Limited, London (GB)

(21) Appl. No.: 13/815,589

(22) Filed: Mar. 12, 2013

Related U.S. Patent Documents

Reissue of:

(64) Patent No.: 8,028,168
Issued: Sep. 27, 2011
Appl. No.: 11/524,741
Filed: Sep. 21, 2006

(30) Foreign Application Priority Data

Sep. 23, 2005 (GB) ..... 0519424.6

(51) Int. Cl.
*H04L 9/32* (2006.01)

(52) U.S. Cl.
USPC ..... 713/176; 726/6

(58) Field of Classification Search
USPC ..... 713/176; 726/6
See application file for complete search history.

(56) References Cited

U.S. PATENT DOCUMENTS

| | | | | |
|---|---|---|---|---|
| 5,042,063 | A | 8/1991 | Sakanishi et al. | |
| 6,823,454 | B1 * | 11/2004 | Hind et al. | 713/168 |
| 6,871,287 | B1 | 3/2005 | Ellingson | |
| 6,954,525 | B2 | 10/2005 | Deo et al. | |
| 7,073,195 | B2 * | 7/2006 | Brickell et al. | 726/5 |
| 2002/0083008 | A1 * | 6/2002 | Smith et al. | 705/64 |
| 2005/0165667 | A1 | 7/2005 | Cox | |
| 2005/0203909 | A1 * | 9/2005 | Zhao | 707/10 |

OTHER PUBLICATIONS

"Data security chief arrested for account hacking," Finextra.com, Aug. 19, 2005, http://www.finextra.com/fullstory.asp?id=14133.

* cited by examiner

*Primary Examiner* — Jeffrey Pwu
*Assistant Examiner* — Anthony Brown
(74) *Attorney, Agent, or Firm* — Wilmer Cutler Pickering Hale and Dorr LLP

(57) ABSTRACT

A system and method for storing identifying information and telephone numbers associated with individuals, and cross-referencing said information so as to link a first individual to other referee individuals capable of identifying the first individual as a result of a telephone conversation. When a relying party wishes to confirm the identity of a contracting party, the system is contacted and, using identifying information pertaining to said contracting party, identifies the set of referee individuals capable of identifying said contracting party, contacts a referee selected at random from the set, and places the contracting party in telephonic communication with the referee. At the conclusion of said telephonic communication, said system invites the referee to state the name of the first individual; by comparing the voice sample with a stored voice sample, the apparatus then provides identity confirmation to said relying party.

11 Claims, 2 Drawing Sheets

SYSTEM AND METHOD FOR VERIFICATION OF PERSONAL IDENTITY

Matter enclosed in heavy brackets [ ] appears in the original patent but forms no part of this reissue specification; matter printed in italics indicates the additions made by reissue.

RELATED PATENT APPLICATION

This application claims priority of British Provisional Patent Application Number 0519424.6 filed Sep. 23, 2005, which is expressly incorporated herein by reference in its entirety.

FIELD OF INVENTION

The present invention is directed to a system and method for verifying personal identity and hence for preventing identity fraud in the context of consumer credit agreements and similar transactions. More specifically, the present invention is directed to a system and method by which potential victims (consumers) may register their identity so that identity can be reliably checked and impostors detected.

COPYRIGHT NOTICE

The disclosure herein contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

Although the anonymity surrounding Internet transactions has drawn increased attention to the problem of identity fraud, its scope is by no means limited to this area: indeed, its history long pre-dates the world of electronic communications. Identity fraud, also known as identity theft, occurs, for example, when a malefactor fraudulently assumes the identity of a victim in order to secure a dishonest advantage. It may involve assumption of the identity of an innocent living person, a dead person, or even (when the intention is to conceal true identity) a wholly fictitious person. One well-established ploy is to use false or stolen documents. With the advent of electronic communications, the production of forged devices (e.g., cards) or misappropriated information (e.g., passwords) will serve the same end.

Identity fraud presupposes a situation in which the parties to a transaction do not know one another, and one party (the "relying party") seeks to verify the identity of the other. To date, solutions to the problem have followed three main routes.

The first solution involves the production of identifying evidence. Examples of such evidence are birth certificate, bank statements, utility bills and similar documents. Their evidential weight relies on the fact that it is generally difficult to assemble a collection of such evidence unless it is already legitimately in the individual's possession. However, an impostor may obtain such evidence by means such as theft and forgery.

The second solution involves what we might call "certification." According to this model, the individual acquires a certificate of identity by applying to an authority with evidence of his identity. The authority checks the evidence and, if satisfied, issues a certificate. One time-honoured example of this approach has been the issuance of passports. In this case, the certificate is the passport. In order to acquire a passport, the applicant has to obtain photographs and present them in person to a reputable member of the community (the authority in this case) who either knows the applicant or who is able to assess the veracity of evidence produced by him. If satisfied, the authority signs the photographs. Trusting the authority, the passport office then issues the certificate bearing one of the photographs.

The second solution may be seen as a special case of the first. The evidence appears stronger, because the evidence has been subjected to impartial scrutiny by a trusted authority; and typically the certificate is more closely bound to the certified individual, by means of a handwritten signature, a photograph, a secret PIN or similar means.

The third solution, which we will refer to as the "coherence" solution, is a relatively recent development. Here, identifying information volunteered by the individual is compared with a number of large databases containing identifying information. This approach, which is proposed by U.S. Pat. No. 6,871,287 to Ellingson and U.S. Patent Application Publication No. 20050165667 to Cox, relies upon the fact that in modern times, individuals interact with many institutions that build up records of identifying information. Credit records, health records, the electoral register, census returns and other large databases provide a wealth of collateral information that can be used to check identity.

All three approaches have significant drawbacks. In the case of the first and second approaches, as has already been mentioned, theft and forgery are all too possible. In addition, they both impose upon the individual the burden of carrying proofs of identity. In the third approach, it is possible for the malefactor to obtain access to databases of identifying information and so make a convincing, though fraudulent, claim. This is particularly a problem where "insiders" are party to fraud, for example call centre staff or bank employees (see, e.g. Data Security Chief arrested for Account Hacking at http://www.finextra.com/fullstory.asp?id=14133).

The weakness that all three solutions have in common is that they tend to concentrate risk by seeking impersonal guarantors of identity—documents, certificates or a plurality of databases. To put it simply, they rely upon touchstones or criteria of identity that are all too easily identifiable by the impostor, who can therefore direct his resources to counterfeiting similar touchstones or satisfying the criteria. They may make it difficult, but the impostor knows exactly what he must do in order to circumvent the safeguards.

SUMMARY OF THE INVENTION

The present invention provides a method and system for the verification of personal of identity. By contrast to prior approaches, the present invention seeks to establish identity by mapping the position of the individual in the social structure. It recognizes that individuals can only be uniquely defined by their relationships with other people, and that human relationships provide the only reliable guarantor of identity.

It also addresses the identity fraud problem from a different perspective. Instead of seeing the problem as that of a relying party who needs to identify an unknown individual, it approaches the question from the viewpoint of the individual who is at risk of identity fraud. In simple terms, it attempts to answer his question "how do I protect myself from identity fraud?"

In one embodiment of the present invention, a system for verifying personal identity of a first party where a second party verifies the identity of the first party is disclosed. The system comprises a processor and a database. The processor receives and stores in the database a first set of information pertaining to at least the first party, wherein the information includes contact information, and a second set of information pertaining to at least one other party personally acquainted with the at least the first party, links the first set of information and the second set of information to create at least one link record linking the at least the first party with the at least one other party, stores the at least one link record in the database, receives information from the second party to verify the identity of the at least the first party, retrieves the first set of information and the at least one link record from the database, uses the at least one link record to retrieve the second set of information pertaining to the at least one other party from the database, requests the at least one other party to verify the identity of the first party, receives a response to the request from the at least one other party, and transmits the response to the second party.

In another embodiment of the present invention, a method for verifying personal identity of a first party where a second party verifies the identity of the first party is disclosed. The method comprises receiving and storing a first set of information pertaining to at least the first party, wherein the information includes contact information and receiving and storing a second set of information pertaining to at least one other party personally acquainted with the at least the first party. The first set of information and the second set of information are linked to create at least one link record linking the at least the first party with the at least one other party. Information from the second party is received to verify the identity of the at least the first party. The first set of information and the at least one link record are retrieved. The second set of information pertaining to the at least one other party is retrieved using the at least one link record. The at least one other party is requested to verify the identity of the first party. A response to the request is received from the at least one other party and transmitted to the second party.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated exemplary embodiments of the invention.

Other objects of the present invention will be evident to those of ordinary skill, particularly upon consideration of the following detailed description of embodiments of the invention.

DETAILED DESCRIPTION OF THE INVENTION

Figure 1:
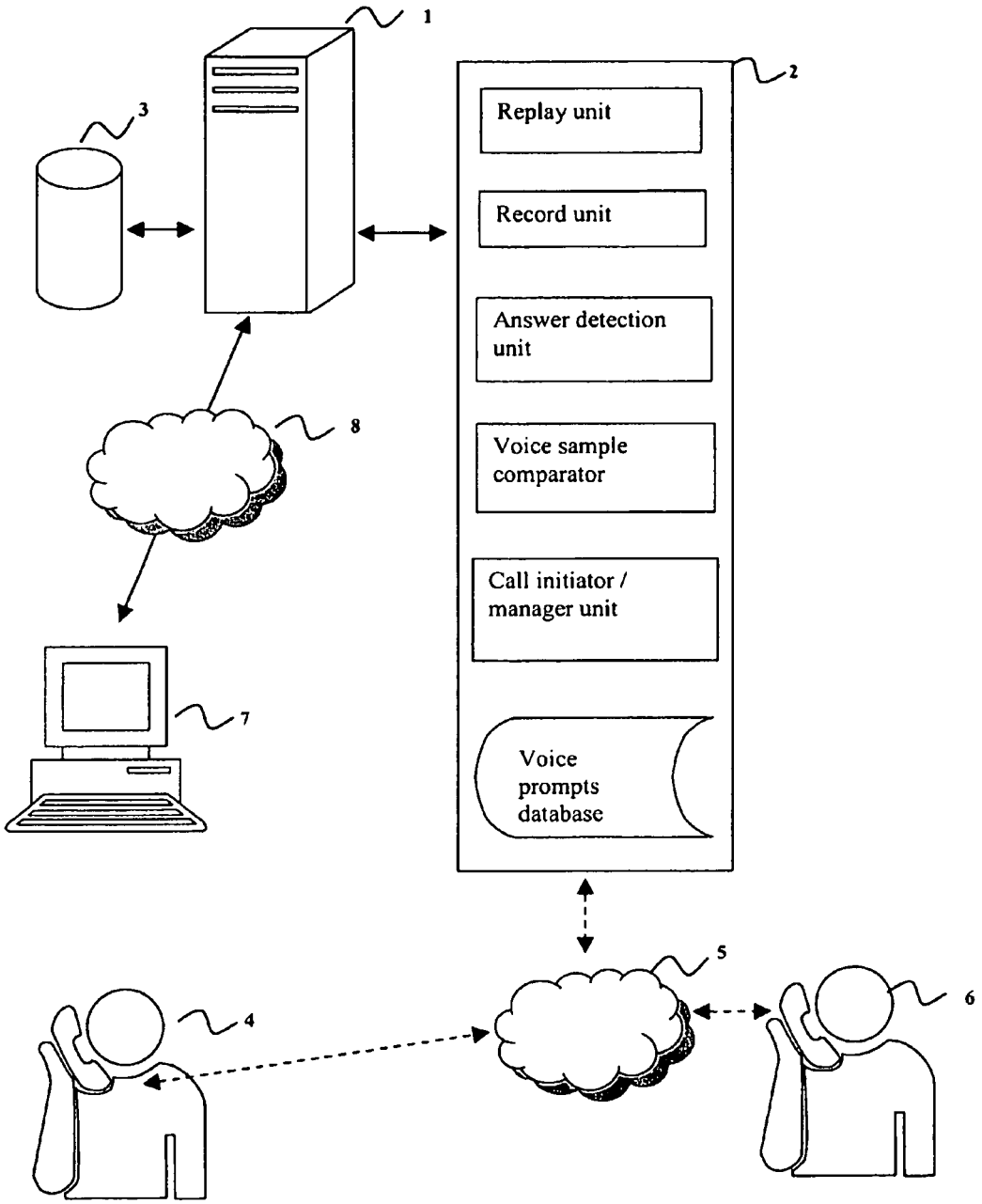
FIG. 1 shows in schematic form illustrative relations between elements in some embodiments of the present invention.

In the following detailed description, numerous specific details are set forth regarding the system and method and the environment in which the system and method may operate, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention. Moreover, various examples are provided to explain the operation of the present invention. It should be understood that these examples are exemplary. It is contemplated that there are other methods and systems that are within the scope of the present invention. Also, the same references numerals are used in the drawings and in the description to refer to the same elements to simplify the description.

The present invention provides a method and system for the verification of personal identity and the prevention of identity theft.

In some embodiments, the first element of the present invention is a database of identity information. This information may come from different sources, including but not limited to an institution that might contribute information about members, employees or customers. Indeed, much of the information may be contributed directly by individuals who wish to protect themselves. Much of this information may already be in the public domain.

The second element is linking information, which will typically be contributed by the users of the system when they register for protection.

The registration process principally involves the individual choosing a number of persons from among his family, friends and associates. For ease of reference, such chosen persons will be referred to herein as "referees." The essential requirement for a referee is that he be able to recognize the applicant by voice in the course of a short conversation (typically, but not necessarily, by telephone). If a nominated referee agrees to act for the applicant, then a link is established. Typically this will be a reciprocal link, i.e., in the normal course of events, two people who know one another well will agree to act as referees for one another (for example, a mother and her daughter). When a referee agrees to act for an applicant, the proposed system will make a voice recording of the referee saying the applicant's name (or nickname or other appellation normally used by the referee to refer to the applicant), and this will be stored in the system as part of the linking information.

Once a person has registered in this way, the system and method of the present invention can be used to prove his identity. When a relying party wishes to verify the identity of a first individual, he presents information identifying the first individual (e.g., name and address). If the first individual is registered, the individual will be located by means of the identifying information. Then, using the linking information, the set of referees who have agreed to act for that first individual are determined. Next, one of the referees from the set of referees is randomly chosen and put in telephonic contact with the first individual. When the referee is ready to identify the first individual, he will indicate this (e.g., by pressing a button on his telephone). The referee is then prompted to say the individual's name. The resulting voice sample will then be compared with the recording made by the referee when his consent was originally sought. Based on whether the referee indicates that he knows the individual, and on the match between the voice samples, an indication will be provided to the relying party whether or not the individual was positively identified.

In the future, a widespread video telecommunications infrastructure may be established. It is apparent that the use of video in addition to audio would make the current invention easier to use and impersonation even harder.

Since credit agreements provide a particular locus of identity fraud, it may be instructive to consider an example of how the present invention would apply in this case. At the outset of the transaction, the lender would supply the system with the borrower's name, address and such other collateral information as enabled the system to identify the borrower's record in the database. If necessary, the lender would also supply a telephone number by which the system could presently contact the borrower. Having identified the borrower's record in the database, the system would select in turn from a randomly ordered list of the borrower's referees and make outgoing calls until contact is made. The borrower and the referee will be connected together and allowed a short period to converse; at the end of that time, the referee will be asked to say the borrower's name. The voice sample will be compared with the previously stored recording and if the samples match, the borrower's identity is verified. The result of the comparison is then returned to the lender.

It is instructive to consider how difficult it is to perpetrate a fraud against someone using the present system and method. An impostor would be faced with creating and maintaining a convincing impersonation throughout the course of a live conversation, to the extent that even the victim's parent, spouse or sibling would not be able to detect the difference—assuming, that is, that the impostor had sufficient knowledge of the victim in the first place.

It might be objected that an impostor could set up a network of bogus referees, perhaps involving a conspiracy of several people each using multiple false identities. However, it is in the nature of a conspiracy that it must be disconnected from the law-abiding majority. It will be recognized that in the typical case, people's relationships are so widespread that it is said that there are only "six degrees of separation" between any two individuals in the world. Whether or not this is true, it is clear that interconnected communities of registrants and referees will tend to establish transitive links across the whole community of registrants. It is a relatively straightforward exercise for a computer program to detect the existence of small, isolated populations, whose very existence will tend to attract suspicion, as will an individual who acts as referee for an inordinate number of people.

It should be noted that as well as providing a method of identity verification that is strong enough to prevent identity theft, the characteristics of the present invention will necessarily act as a powerful deterrent to prospective fraudsters. The process of identity verification requires the subject and to the referee to communicate using a telecommunications system. It would be a rudimentary adjunct to the system and method of the present invention, using techniques well known in the art, to add audit trail and reporting facilities that would enable law enforcement agencies to obtain full evidence of fraudulent activity. The very nature of the present invention would be to build an evidential trail to the identity of any and all fraudulent agents seeking to misuse the system and method.

Another interesting property of the present invention is that while it uses a database of identity information, it does not place particular reliance on the accuracy of this information. If, for example, someone were to give a false address or other false identifying information, the result would simply be that the system and method would identify the referees (if any) corresponding to the known holder of those identifying attributes, who would of course fail to identify any impostor. This is because the information held on the database is not used to verify identity, but rather to identify what set of referees to contact for that purpose. In theory, therefore, an individual could be identified purely on the basis of, say, his personal telephone number; and if a relying party had independent means to associate that telephone number with the individual, the proposed system would function without the need even to know the individual's name.

It is useful to bear the foregoing point in mind when considering the motivational structure underlying the present invention, and contrasting it with other personal identification systems and methods. In the case of the evidential and "certification" methods, the relying party imposes on the individual the burden of carrying supporting evidence or certification of his identity. The "coherence" solution relies upon aggregation of personal data by institutions that are not directly answerable to the individuals concerned. By contrast, the present invention uses personal information only to link the individual to his chosen referees. Whereas the other identification systems require such specific evidence or information as satisfies the norms of those systems, the present invention allows individuals to contribute as much or as little personal identifying information as they require. For example, an individual might register his bank account or credit card numbers with the system of the present invention. Thereafter, any impostor who attempted to use that individual's stolen credit card or bank statement as evidence of identity would be automatically linked to the rightful owner's chosen referees, who would naturally detect the fraud. It should also be noted that whereas previous identification methods focus upon the relationship between an individual and certain authorities or institutions, the present invention focuses upon the relation between an individual and his peers. The relationship between an individual seeking to protect himself from identity fraud and his chosen referees is in principle a reciprocal one, so that in practice it is to be expected that individuals will voluntarily commit themselves to act co-operatively as referees for one another.

Further, the present invention protects the personal confidentiality of the individual better than previous identification methods, all of which require that certain identifying information be put either into the public domain or into the hands of authorities. According to the system and method of the present invention, all identifying information (e.g., name, address, bank account details, etc.) volunteered by the individual is used merely to locate the individual's chosen referees in the database. It is never necessary for any such identifying information to be disclosed.

Preventing the identities of dead people from being assumed, particularly the recently deceased, is a considerable challenge. With existing solutions, it can be many days or even weeks before the various authorities are informed of a death and for them to have updated their databases, leaving a considerable window within which fraud can be perpetrated. In contrast, the present invention is immediately effective in preventing such frauds because the referees, being relatives or close associates, will necessarily be more immediately aware of the victim's death and will naturally be suspicious of anyone purporting to be them.

Finally, the present invention has the advantage that without imposing any burden on the individual, it is available everywhere and in all circumstances where it may be expedient to verify identity. The individual does not need to remember to take with him any special tokens of identity; nor does the relying party need to obtain a multiplicity of corroborative information or consult a multiplicity of databases.

Turning now to the drawings, and initially FIG. 1, there is illustrated in schematic form the relations between elements in one embodiment of the present invention. The illustrated system comprises a database 3, a processor 1, a data communications system 8, a telecommunications system 2, and a telecommunications network 5 capable of supporting real-time oral communications between people. In the illustrated embodiment, the telecommunications network 5 is the telephone network. The present invention is not restricted to using the telephone network and may equally employ other communications systems and infrastructures including but not limited to wide area networks, the Internet, packet switched networks, wireless networks, etc. In the future, such communications systems may include visual and other information, and these are expressly included within the scope of the present invention.

From an object-oriented perspective, the database 3 contains two types of entity: individual records, and links between individuals.

Figure 2:
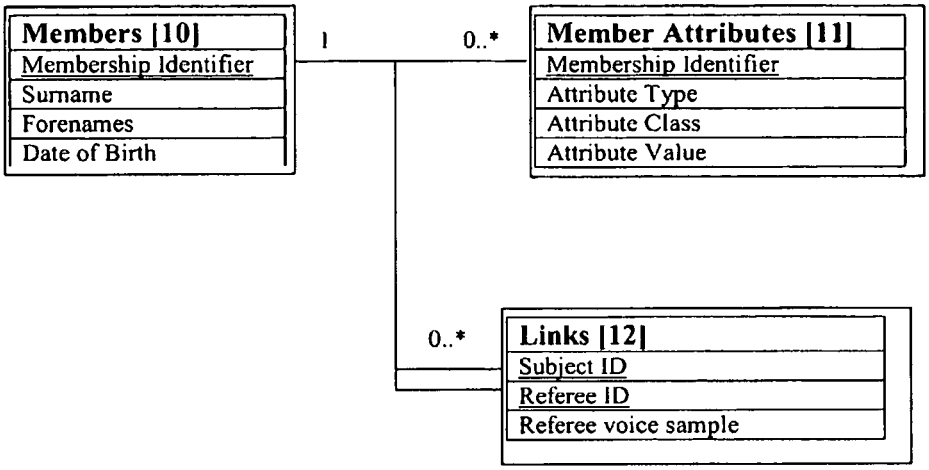
FIG. 2 shows a table schema for the database used in some embodiments of the present invention.

Individual records are a complex of identifying information, which will typically include surname and forenames, e.g., first name and middle initial, date of birth and address, and may include social security number, e-mail address and other identifiers. They will also include telecommunications contact information, and in particular, telephone numbers. They may also include collateral information that may aid in identification, such as bank account and credit card numbers. Principal fixed identifying information such as surname, forenames and date of birth are contained in the principal Members table 10 as illustrated in FIG. 2. Each principal individual record also contains a unique Membership Identifier. Associated optional information is contained in a linked Attributes table 11, linked by the Membership Identifier.

Link records 12 (illustrated in FIG. 2) are simpler in structure, containing a link to the subject (by Membership Identifier), the referee (again by Membership Identifier) and a recording of the referee saying the subject's name (or nickname or other appellation normally used by the referee 6). If a subject selects six referees, all of whom consent to act for him, and assuming that all six referees agree to allow the subject to act reciprocally as their referee, then ipso facto there will be twelve link records in the Links table 12.

The telecommunications system 2 comprises a database of prompt recordings and in some embodiments of the present invention includes at least the functional components illustrated in FIG. 1, namely: call initiation and management, speech recording and playback, and a facility to detect when calls are answered. These elements are well known in the art and form a standard part of all interactive voice response (IVR) systems in operation at the present time (such as, for example, the telephony platform operated by LignUp Corporation of Mountain View, Calif.). The telecommunications system 2 further comprises a voice sample comparator. This is a component of voice dialing technologies as employed by the telecommunications processor taught by, for example, Deo et al. in U.S. Pat. No. 6,954,525, which is expressly incorporated herein by reference. One exemplary implementation of a voice sample comparator would be the simple system taught by Sakasnishi et al in U.S. Pat. No. 5,042,063 or the inventions referred to therein which are expressly incorporate by reference herein. It is sufficient that the voice sample comparator can compare speech samples wherein the same words are spoken by the same speaker.

In operation, a relying party (not illustrate) seeking to verify the identity of a transacting party 4 contacts the system processor 1 using a data terminal 7 via the data communications system 8, providing information identifying the transacting party 4 and the telephone number on which he is currently available. The system processor 1 compares this information with the identity records in the database 3 and returns one of three status results: "not found," "ambiguous" or "identified." In the case that the result is "ambiguous," the relying party must acquire additional collateral information and repeat the enquiry. In the case that the result is "identified, " the system processor 1 then obtains the Membership Identifier of the identified record and uses it to select from the link records those corresponding to the transacting party's referees. It then forms a list, in random order, of the Membership Identifiers of the referees. Until a call with a referee is established, the system processor 1 will then look up each referee in turn and obtain the referee's preferred telephone number. The system processor 1 then uses the telecommunications system 2 to place a call to the referee 6 and the answer detecting unit to determine whether the call was answered. The telecommunications system 2 then plays an introductory recording to the referee 6 using the replay unit, while simultaneously contacting the transacting party 4 in a similar way. The telecommunications system 2 then connects the transacting party 4 and the referee 6 so that they can converse. When the referee 6 presses a button on his telephone, the transacting party 4 and the referee 6 are separated. The transacting party 4 is instructed to hang up his telephone. The referee 6 is asked to indicate whether he identified the transacting party. If the referee 6 indicates that he did, he is asked to say the transacting party's 4 name, and the record unit of the telecommunications system 2 is used to make a recording of this response. Another brief prompt, thanking the referee 6, is played before terminating the call to the referee 6. The system processor 1 then retrieves the original recording from the link record of the database 3, supplies both to the voice sample comparator of the telecommunications system 2, and obtains a similarity score.

The system processor 1 meanwhile also computes a Connectedness Index in respect of the transacting party 4. The Connectedness Index indicates the extent to which the transacting party 4 is linked to other individuals registered with the system. It will be recalled that database 3 contains link records connecting the transacting party 4 with his referees 6. Naturally, similar link records will connect the referees 6 to their respective referees; these may be termed second-degree links relative to the transacting party 4. In turn, the second-degree links may be expected to lead in turn to a still greater number of third-degree links, and so on. Following these links outward from the transacting party 4 therefore will normally lead to more and increasingly more links at each successive degree. However, in the case that a fraudulent transacting party 4 creates and appoints false identities as referees 6, these false identities will naturally not exhibit a typical pattern of interconnectedness with the wider population. The connectedness index can therefore indicate the possibility of a fraud involving false identities.

In some embodiments of the present invention, the Connectedness Index may be computed by calculating a weighted sum of the number of distinct individuals lying at or within three degrees of separation, weighting the second degree by a multiple of five. The calculation is performed by following a breadth-first traversal of links in the link table of the database 3. If the sum is greater than any previously calculated sum, then the newly calculated sum is stored as the highest sum. Finally, the Connectedness Index is calculated by dividing the newly calculated sum by the highest sum. The system processor 1 then transmits an indication of the outcome to the data terminal 7 of the relying party, via the data communication system 8, specifying the referee's 6 identification response, the similarity score, the total number of the transacting party's 4 referees, and the Connectedness Index.

Although the invention has been described and illustrated in the foregoing exemplary embodiments, it is understood that the present disclosure has been made only by way of example, and that numerous changes in the details of construction and combination and arrangement of processes and equipment may be made without departing from the spirit and scope of the invention as claimed below.

What is claimed is:

1. A system for verifying personal identity of a first party where a second party verifies the identity of the first party, comprising:

a database; and a processor that receives and stores in the database a first set of information pertaining to at least the first party, wherein the information includes identifying information and contact information, and a second set of information pertaining to at least one other party personally acquainted with the at least the first party, wherein the second set of information includes contact information and a voice recording of the at least one other party speaking the name of the first party, links the first set of information and the second set of information to create at least one link record linking the at least the first party with the at least one other party, stores the at least one link record in the database, receives via a data communications network identifying information from the second party to verify the identity of the at least the first party, matches the identifying information received from the second party with the first set of information stored in the database, retrieves the matched first set of information and the at least one link record from the database, uses the at least one link record to retrieve the second set of information pertaining to the at least one other party from the database, uses the contact information to place the at least one other party in communication with the first party via a telecommunications network, requests the at least one other party to verify the identity of the first party, receives a response to the request from the at least one other party, compares the response to the recording previously made by the at least one other party, and transmits a result of the comparison to the second party via the data communications network.

2. The system of claim 1 wherein when the processor transmits the response to the second party, the processor calculates a connectedness index indicating the extent to which the at least the first party is linked to other parties personally acquainted with the at least the first party, and transmits the connectedness index and the response received from the at least one other party to the second party.

3. A method for verifying personal identity of a first party where a second party verifies the identity of the first party, comprising:

receiving at a processor and storing in a database a first set of information pertaining to at least the first party, wherein the information includes identifying information and contact information;

receiving at the processor and storing in the database a second set of information pertaining to at least one other party personally acquainted with the at least the first party, wherein the second set of information includes contact information and a voice recording of the at least one other party speaking the name of the first party;

linking the first set of information and the second set of information in the database to create at least one link record linking the at least the first party with the at least one other party;

receiving at the processor via a data communications network identifying information from the second party to verify the identity of the at least the first party;

matching the identifying information received from the second party with the first set of information stored in the database;

retrieving the matched first set of information and the at least one link record from the database;

using the at least one link record to retrieve the second set of information pertaining to the at least one other party from the database;

using the contact information to place the at least one other party in communication with the first party via a telecommunications network;

requesting the at least one other party to verify the identity of the first party;

receiving a response to the request from the at least one other party at the processor via the telecommunications network;

comparing the response to the recording previously made by the at least one other party; and transmitting a result of the comparison to the second party via the data communications network.

4. The method of claim 3 wherein transmitting the response to the second party further comprises calculating a connectedness index indicating the extent to which the at least the first party is linked to other parties for which the second set of information has been received and stored, and transmitting the connectedness index and the response received from the at least one other party to the second party.

5. The system of claim 1 wherein the data communications network is the Internet.

6. The system of claim 1 wherein the data communications network is a virtual private network.

7. The system of claim 1 wherein the data communications network is a packet switched computer network.

8. The system of claim 1 wherein the telecommunications network is a telephone network.

9. The system of claim 1 wherein the telecommunications network is an Internet-based network.

10. The system of claim 1 wherein the telecommunications network conveys human speech.

11. The system of claim 1 wherein the telecommunications network conveys visual information.

* * * * *